United States Patent [19]

Flusin

[11] 4,262,778
[45] Apr. 21, 1981

[54] HIGH-ABSORPTION BUMPER DEVICE FOR VEHICLES

[75] Inventor: Francois Flusin, Paris, France

[73] Assignee: Ugine Aciers, Paris, France

[21] Appl. No.: 49,062

[22] PCT Filed: May 2, 1979

[86] PCT No.: PCT/FR78/00007

§ 371 Date: May 2, 1979

§ 102(e) Date: May 2, 1979

[87] PCT Pub. No.: WO79/00124

PCT Pub. Date: Mar. 22, 1979

[30] Foreign Application Priority Data

Sep. 2, 1977 [FR] France .............................. 77 27523

[51] Int. Cl.³ .................................................. F16D 63/00
[52] U.S. Cl. .................................. 188/1 C; 188/266;
188/298; 188/322; 293/133; 293/134
[58] Field of Search ................... 293/133, 134, 107;
188/1 C, 298, 266; 74/492; 267/122; 64 R

[56] References Cited

U.S. PATENT DOCUMENTS

| | | | |
|---|---|---|---|
| 2,412,885 | 12/1946 | Harmon | 188/297 X |
| 2,919,883 | 1/1960 | Murphy | 267/122 X |
| 3,428,150 | 2/1969 | Muspratt | 188/1 C |
| 3,588,159 | 6/1971 | Duckett et al. | 293/134 X |
| 3,695,665 | 10/1972 | Matsuura | 267/122 X |
| 3,923,292 | 10/1975 | Madden, Jr. | 188/1 C X |
| 3,975,006 | 8/1976 | Peterson | 188/1 C X |

Primary Examiner—George E. A. Halvosa
Attorney, Agent, or Firm—Dennison, Meserole, Pollack & Scheiner

[57] ABSTRACT

The bumper device which is the object of the invention relates principally to the absorption of high energy impacts which can be sustained by all types of moving bodies or vehicles and in particular by cars.

In its preferred embodiment, the device comprises one or more capacities usually arranged at the front of the vehicle and containing a hydraulic fluid. Each of these capacities is connected by a pipe to a receiving chamber which can be deformed by expansion and is also filled with fluid. Under the influence of a violent impact, these capacities crush and eject the fluid which they contain towards the receiving chambers, the walls of which dilate in proportion to the entry of the fluid. The plastic deformation of these walls absorbs the energy of the impact.

This device is more particularly suited to the production of high absorption bumpers for cars and preferably comprises receiving chambers made of austenitic steel with unstable austenite.

13 Claims, 6 Drawing Figures

Before Impact

After Impact

Before Impact

After Impact

HIGH-ABSORPTION BUMPER DEVICE FOR VEHICLES

The device which is the object of the invention relates to the absorption of impacts generally sustained by any moving body and more particularly by any type of vehicle. More precisely, this device relates to the absorption of harsh impacts sustained by vehicles transporting passengers and in particular cars and railway carriages.

The problems relating to the safety of passengers during accidents in vehicles of all types has for many years formed the subject of numerous studies. These studies have shown that in order to avoid or to reduce the trauma to passengers in vehicles by harsh impacts it was necessary not only for the passengers to be securely held inside the vehicle, for example by means of belts, but also for these passengers not to be subjected to too abrupt decelerations. Systematic tests have shown that the maximum decelerations which the human body can withstand do not exceed 40 to 50 g (g being the acceleration of gravity).

It has been noted that it was not necessary to attempt to give the assembly formed by the bumper and the vehicle a maximum rigidity but, on the contrary, it was necessary to allow elastic or permanent deformations in well defined zones in the event of an impact.

Thus, for example, it is proposed in U.S. Pat. No. 3,695,665 that tubular bumpers arranged at the front and at the rear of vehicles and made of a flexible material such as rubber be used for absorbing impacts, these tubes being filled with a fluid. This fluid can escape through small orifices affording a high resistance to passage and can fill auxiliary capacities having flexible walls. The system is designed to absorb elastically and repeatedly impacts of relatively low intensity, the energy of impact being dissipated mainly by the friction of the fluid against the walls of the orifices which place the auxiliary capacity in communication with the internal volume of the bumper. It is easy to understand that the energy which is likely to be absorbed in this way is limited by the fact that it is not possible to produce elastomeric walls and pipes which are capable of affording very high resistances to deformation and to friction and which are capable of withstanding heating at high temperature. In fact, it should also be known that practically all the energy absorbed is transformed into heat during such impacts and can only be transmitted to the ambient medium after a long delay.

French Pat. No. 2,240,619 describes a device of similar design in which the bumper comprises a rigid profile which is connected to a fixed cross member forming an integral part of the chassis of the vehicle by means of capacities in the shape of cylindrical bellows whose folds are made of elastic material and which contain a liquid. Under the influence of an impact, the bellows are compressed and the liquid contained in them escapes through narrow orifices, or throttle points, into a chamber with elastic wall which inflates.

As in the case of the U.S. Patent, the energy is mainly absorbed as a result of the friction caused by the passage of the fluid through very small orifices or throttle points made in the partition separating the bellows from the chamber with flexible walls.

These devices are very suitable for absorbing impacts of very low kinetic energy of the type produced when manoeuvering a car in a garage or possibly in the event of impacts at speeds lower than a few kilometers per hour at the moment of the collision between cars in urban traffic.

In fact, as soon as the speeds of collision become higher than about 10 kilometers per hour, the capacity of these devices to absorb kinetic energy becomes very inadequate since the elastomeric walls of the capacities can no longer provide sufficient resistance to the considerable increase in the pressure of the fluid during the collision, and the energy absorbed during the passage of the fluid through the calibrated orifices or the throttle points does not increase when the kinetic energy of the impact increases. The only possible solution for increasing the capacity of absorption of such devices would involve substantially increasing the volume of these elastomeric deformable capacities, but such an increase would very greatly exceed the means of mounting these devices on cars.

The possibility has therefore been examined of producing a bumper device capable of absorbing impacts of high kinetic energy such as those resulting from the collision of a moving body or of a vehicle against an obstacle which may be stationary or not stationary at speeds which can attain several tens of kilometers per hour while at the same time giving this device dimensions which are compatible with its installation, for example on common types of cars. The possibility of obtaining decelerations not exceeding 50 g by means of such devices has also been examined. Finally, the possibility has been examined of absorbing relatively large quantities of energy by means of relatively small quantities of material without using prohibitively priced materials.

We have had the unexpected idea of solving this problem by absorbing this kinetic energy, not by using the friction of a fluid on the walls, but by utilizing this energy directly for the plastic deformation of metals having a high resistance to deformation. During the first tests designed to evaluate the means of carrying out such an idea, it has been observed that the kinetic energy absorbed by the plastic deformation of a beam formed by a profile of sheet metal, which is subjected to a stress of compression parallel to its axis, was generally very low. In fact, from the moment when the phenomenon of buckling is produced in the beam, the plastic deformations were limited to very small volumes located at the points where the folds of very small diameter has formed. The volume of these plastically deformed zones usually only represented the order of 1% or slightly more of the volume of metal in the beam.

The means has thus been found of producing a metallic structure capable of absorbing large quantities of energy owing to a plastic deformation covering practically all its active part. This structure, which acts as a receiver of the energy liberated at the moment of a collision, is formed by a chamber having relatively small dimensions, produced from a metal or metal alloy capable of withstanding large plastic deformations under the influence of high stresses. The impact energy developed at the moment of a collision is transmitted to this chamber by a fluid which is only slightly compressible, is heat-resistant and is contained therein. This fluid, which is of the type used for the hydraulic brakes of fast vehicles, is compressed at the moment of the impact and thus exerts stresses on the internal face of the chamber wall which rapidly exceed the elastic limit of the metal or alloy forming it and cause its expanding plastic deformation.

In a preferred embodiment of the device according to the invention this receiving chamber communicates with a chamber, also made of metal, which is filled with the same fluid and acts as an emitter. This emitting chamber is designed to receive the impact sustained by the vehicle directly or indirectly, and to gradually flatten under the influence of this impact, ejecting at least a portion of the fluid which it contains toward the receiving chamber whose walls will dilate by plastic deformation in proportion to the entry of the fluid. The emitting chamber and receiving chamber can be joined to each other or, on the contrary, arranged at a certain distance from each other and placed in communication by a connecting tube.

As will be shown in the examples, it is possible to produce emitting and receiving chambers which allow violent impacts to be deadened. The dimensions of the emitting chamber have to allow the impact to be deadened by a gradual deformation and its walls have to resist, without cracking, the internal pressure of the fluid which is gradually ejected towards the receiving chamber. The characteristics of the latter have to be calculated in order to be able to receive by plastic deformation the fluid ejected from the emitting chamber, without rupturing or at worst with rupturing only after a significant plastic deformation.

The non-limiting examples below describe several embodiments of the invention. In these examples the receiving chamber which has to absorb the kinetic energy by plastic deformation has been produced from austenitic steel made of unstable austenite, because such steels are particularly useful as a material for absorbing high energies of impact, owing, on the one hand, to their eminent suitability for hammer-hardening and, on the other hand, to the conservation of their properties for very high speeds of deformation.

EXAMPLE 1

Figure 1:
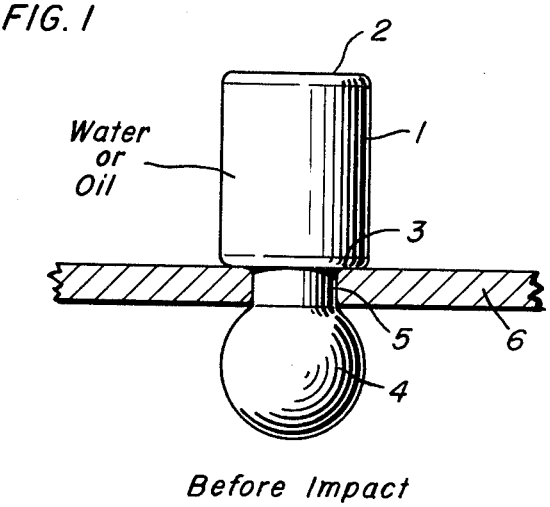
FIG. 1 is a top plan view of an exemplary embodiment of an energy absorption device constructed in accordance with the present invention before being subjected to an impact.
Figure 1A:
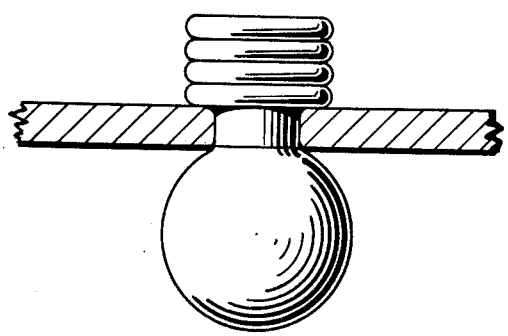
FIG. 1A is a top plan view of the device of FIG. 1 showing deformation of a portion thereof after impact against a stationary or moving obstacle.

This example describes the principle of operation of the device according to the invention. FIG. 1 shows a cylinder 1 made of Z10CN 17-08 (AFNOR standard) steel, blocked at its end 2 by an end plate of the same thickness and resting with its other end 3 on a support 6 arranged on the front of a vehicle and integral with the chassis. The end 2 is directed forwards, the end 3 is open so that the cylinder 1 communicates with a sphere 4 which is also made of Z10CN 17-08 steel and is of thickness less than that of the steel forming cylinder 1. The communication between the cylinder 1 and the sphere 4 is established by means of a tube 5, the three pieces being assembled in such a way that they constitute an assembly which is tight for the fluid contained therein (water or oil for example). If the front of the vehicle is involved in a frontal impact against a stationary or moving obstacle, the impact crushes the cylinder 1 which buckles in accordion fashion. This results in an increase in the pressure within the liquid which inflates the sphere 4. The dimensions of the cylinder 1 and of the sphere 4 are calculated so that the energy of deformation is comparable to the energy to be absorbed. In particular, the cylinder 1 is sufficiently thick for the plurality of deformations, caused on the one hand by the accordion buckling and on the other hand by the increase in pressure, not to risk causing it to rupture. The reduction in the height of the cylinder 1 caused by crushing determines the deceleration acceptable to the human body from the speed of impact for which the device is designed.

EXAMPLE 2

Figure 2:
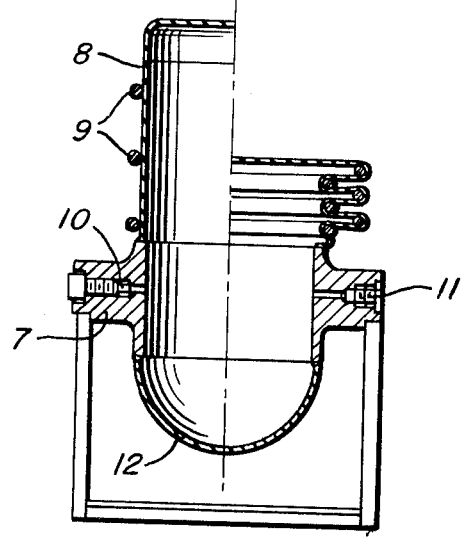
FIG. 2 is a longitudinal cross-sectional view of a further embodiment of a high-absorption device particularly suited for simulation tests and wherein the configuration of a portion thereof before and after impact is illustrated.

FIG. 2 shows an experimental embodiment for simulation tests. A cylinder 8 made of Z 10CN 17-08 stainless steel sheet of thickness E=1 mm, 100 mm in diameter, about 130 mm in height and a hemisphere 12 capped with stainless steel sheet of the same type, of thickness e=0.6 mm and 100 mm in diameter are welded onto a crown 7 made of Z2CN 18-10 stainless steel (AFNOR standard). Frets 9 made of Z10CN 18-09 stainless steel wire, 7 mm in diameter, are distributed over the height of the cylinder 8 so as to localize the formation of folds when the impact occurs. The container thus formed is filled with oil through the orifice 10 which will subsequently be closed by a stopper. The internal pressure is measured by means of a manometer connected to the chamber by means of the orifice 11. The circumference of the crown 7 rests on a support made of mild steel representing the chassis of the vehicle.

By exerting a stress increasing to 135,000 N on the top surface of the cylinder, the cylinder is crushed by 55 mm, the internal pressure is increased to 130 bar and the hemisphere breaks after sustaining biaxial lengthening by 30% measured on the basis of 5 mm and this corresponds to a total deformation energy of 5000 J. This energy corresponds to that of a moving body, 230 kg in mass, striking a stationary obstacle at a speed of 24 km per h, the arrest being produced with an average deceleration of 40 g.

EXAMPLE 3

Figure 3:
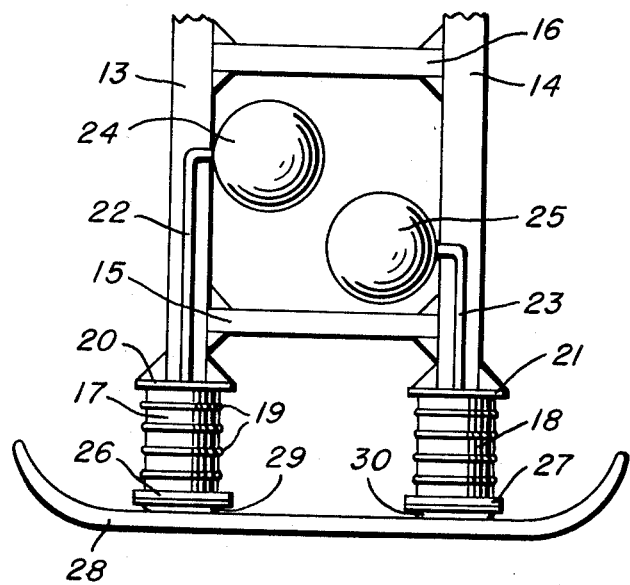
FIG. 3 is a top plan view of another embodiment of a high-absorption device in accordance with the present invention shown operatively mounted relative to a bumper and members comprising a portion of a car frame.

FIG. 3 shows a device according to the invention mounted on a car having a total mass of 1000 kg. This figure shows only the method of mounting the bumper device at the front of the vehicle, showing only the ends of two very rigid side members 13 and 14 which are integral with each other by means of cross members 15 and 16 and also, in a manner which is not described, are integral with the resistant structure of the vehicle.

Two cylindrical collars 17 and 18 are mounted in the extension of these two side members at its horizontal axis made of Z10CN 17-08 steel, 160 mm in diameter, 300 mm long and 1.5 mm thick. Annular frets such as 19 made of Z10 CN 18-09 stainless steel wire of 3 mm in diameter surround each collar about every 50 mm. These collars are welded by their rear end to two discs made of the same type of steel 20 and 21, 200 mm in diameter and 3 mm thick, in turn welded to the end of the side members. Two highly pressure-resistant tubes 22 and 23 are each connected by one end to the end of the discs 20 and 21 and by the other end to one of the spheres 24 and 25 and connect the internal volume of each cylinder to that of a sphere. Each sphere, which is also made of Z10CN 17-08 steel, is 120 mm in radius and 1 mm thick.

The collars 17 and 18 are closed at the front by welded discs 26 and 27 and their dimensions are the same as those of discs 20 and 21.

A conventional bumper structure formed by a steel profile 28 is fixed by means of fasteners 29 and 30 to the discs 26 and 27. Each assembly constituted by a cylinder, a sphere and the tube joining them is filled with a hydraulic fluid which is preferably of low viscosity, stable to heat and only slightly compressible.

Tests have shown that such a device was capable of absorbing the kinetic energy liberated by the frontal impact of a vehicle weighing 1000 kg launched at 40 km per h against a stationary wall. During such an impact, the pressure in the hydraulic system passes through a maximum of about 100 bar and the energy absorbed by the plastic deformation of each sphere is about 30,800 joules, that is 61,600 J for the assembly of two spheres. Finally, the deceleration is approximately 30 g.

Figure 4:
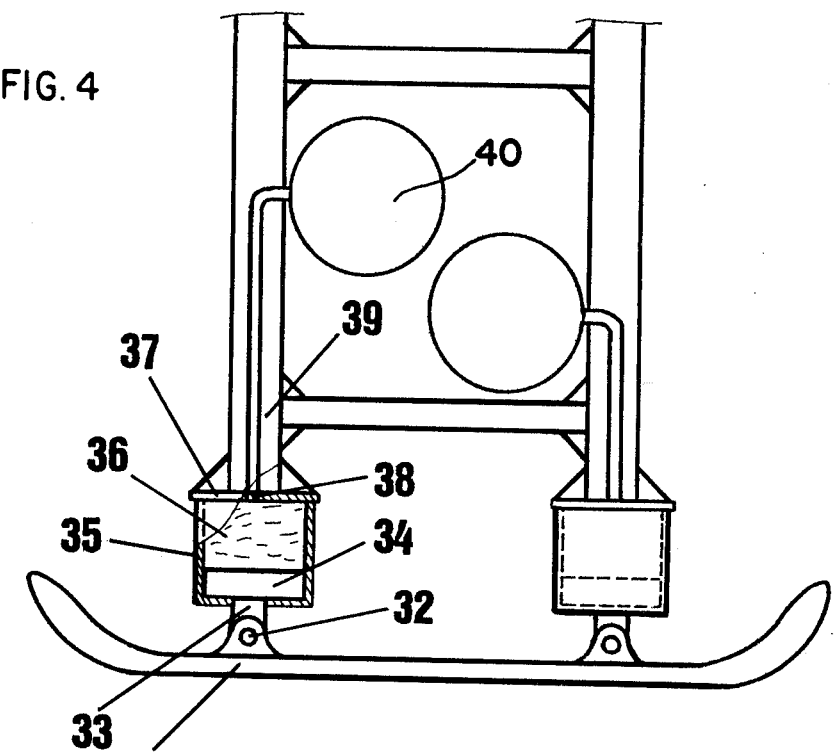
FIG. 4 is a top plan view of still another embodiment of a high-absorption device in accordance with the present invention with portions thereof broken away to show interior details.

It is very obvious that numerous other embodiments of the device according to the invention can be considered. In particular, the fluid in the receiving container can be compressed by other means apart from the crushing of an emitting chamber. In particular, as shown in FIG. 4 this emitting chamber can be replaced by a cylinder 35 inside which is placed a piston 34 arranged so as to receive any impact directly or indirectly. In this case, in the event of an impact against bumper 31, the piston 34 pivotally journaled at 32 by connecting rod 33 will penetrate into the cylinder and will drive out fluid 36 contained in the cylinder 35, which fluid 36 will be charged through a port 38 in cylinder wall 37 into a connecting tube 39 into a plastically deformable receiving chamber 40, for example of the type described in Example 3.

Figure 5:
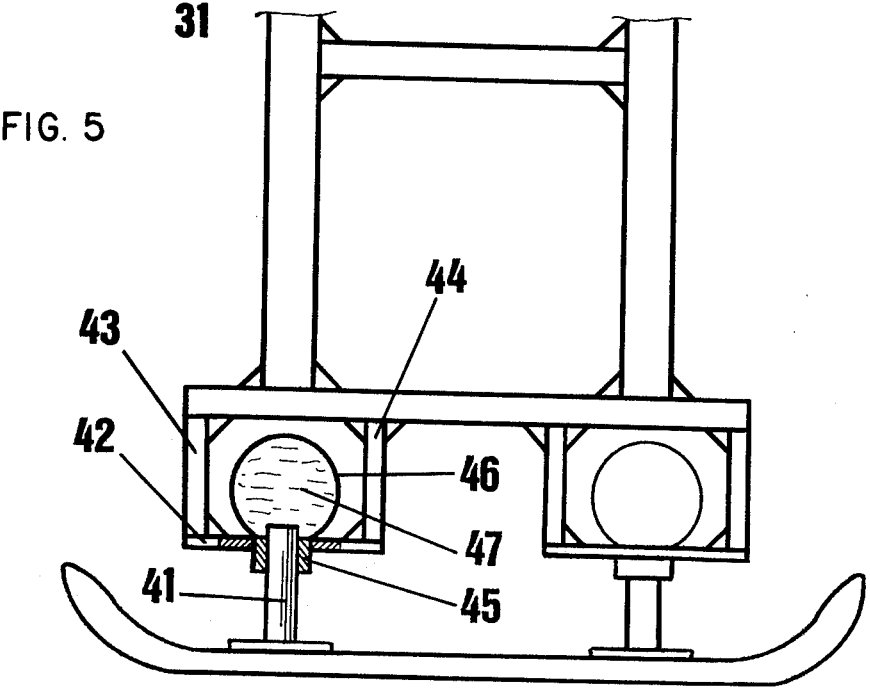
FIG. 5 is a top plan view of still another embodiment of a high-absorption device in accordance with the present invention with portions thereof broken away to show interior details.

As shown in FIG. 5 the direct penetration of a plunging piston 41 integral with the bumper which piston 41 penetrates directly into a chamber 46 with plastically deformable walls filled with fluid 47 is provided. It will be appreciated that the transmitting fluid 47 is compressed in the receiving chamber 46 by means of the plunging piston 41 which is adapted to penetrate, i.e. telescope, into the interior of the chamber 46 through a fluid sealed support means 45 carried by member 42 integral with bracket members 43 and 44 of the car frame structure.

Finally, the receiving chamber with plastically deformable walls can be of any shape. Spherical or partly spherical shapes are in principle the most favorable but it is obvious that other shapes can be considered. The plastic deformations obtained by means of the fluid contained in the capacity will be obtained in the most general manner by expansion. This expansion could possibly be orientated in certain preferred directions and be limited in other directions.

I claim:

1. In a method of progressively absorbing the kinetic energy liberated by the impact of a moving body against an obstacle, the improvement comprising the steps of providing the moving body with an irreversibly plastically deformable generally hollow normally non-rupturing metallic chamber, providing an impact receiving member in impact generated kinetic energy transmitting relation to a generally non-compressible kinetic energy transmitting liquid provided within the metallic chamber, absorbing the kinetic energy of the impact by subjecting the generally non-compressible liquid in the metallic chamber to kinetic energy transmitted thereto by the impact receiving member to outwardly and irreversibly plastically deform the metallic chamber by uniformly subjecting the inner surface of the walls defining the chamber to the force transmitted by the generally non-compressible liquid to outwardly deform the chamber.

2. The method according to claim 1, wherein the transmitting liquid in the deformable chamber originates from a compressible metallic emitting chamber which is compressed at the moment of the impact.

3. The method according to claim 1, wherein the transmitting liquid is injected into the metallic chamber by means of a piston moving in a cylinder at the moment of impact.

4. The method according to claim 1, wherein the transmitting liquid is subjected to the action of a plunging piston which penetrates the interior of the deformable chamber.

5. The method according to one of claims 1, 2, 3 or 4, wherein the liquid utilized is only slightly compressible.

6. The method according to one of claims 1, 2, 3 or 4, wherein the liquid utilized is heat-resistant and preferably nonflammable.

7. An energy absorbing device for the absorption of an impact sustained by a moving body comprising an emitting means for receiving the impact, a generally non-compressible transmitting liquid receiving chamber having metallic walls capable of a large degree of plastic deformation under high stresses, a generally non-compressible energy transmitting liquid in the chamber and of sufficient volume when subjected to kinetic energy generated in response to an impact on said emitting means to transmit energy to the inner surface of the chamber walls for outwardly expanding generally irreversible normally non-rupturing plastic deformation of said receiving chamber whereby kinetic energy so generated is absorbed by the deformation of the walls of the receiving chamber.

8. A device according to claim 7 in that the receiving chamber is made of austenitic steel with unstable austenite.

9. A device according to claim 7 in that the emitting means is made of stainless steel.

10. A device according to claim 7 in that the receiving chamber comprises spherical or partially spherical deformable parts.

11. The energy absorbing device according to claim 7 wherein the emitting means comprises a metal or metal alloy liquid emitting chamber which is deformed by an impact.

12. The energy absorbing device according to claim 7 wherein the emitting means comprises a piston movable within a liquid containing cylinder in response to an impact.

13. The energy absorbing device according to claim 7 in which the emitting means comprises a piston telescopically receivable within the receiving chamber in response to an impact.

* * * * *